(12) United States Patent
Isepponi (10) Patent No.: US 10,153,633 B2
(45) Date of Patent: Dec. 11, 2018

(54) METHOD AND DEVICE FOR MONITORING AN ELECTRICAL NETWORK IN A RAIL VEHICLE, AND RAIL VEHICLE

(71) Applicant: Bombardier Transportation GmbH, Berlin (DE)

(72) Inventor: Gerhard Isepponi, Boppelsen (CH)

(73) Assignee: Bombardier Transportation GmbH, Berlin (DE)

( * ) Notice: Subject to any disclaimer, the term of this patent is extended or adjusted under 35 U.S.C. 154(b) by 97 days.

(21) Appl. No.: 15/513,791

(22) PCT Filed: Sep. 23, 2015

(86) PCT No.: PCT/EP2015/071817
§ 371 (c)(1),
(2) Date: Mar. 23, 2017

(87) PCT Pub. No.: WO2016/046247
PCT Pub. Date: Mar. 31, 2016

(65) Prior Publication Data
US 2018/0115149 A1    Apr. 26, 2018

(30) Foreign Application Priority Data
Sep. 24, 2014  (DE) .................. 10 2014 219 278

(51) Int. Cl.
*H02H 7/08* (2006.01)
*H02H 3/44* (2006.01)
(Continued)

(52) U.S. Cl.
CPC .............. *H02H 3/44* (2013.01); *H02H 3/027* (2013.01); *H02H 7/08* (2013.01); *H02H 7/0854* (2013.01);
(Continued)

(58) Field of Classification Search
USPC .......... 318/474, 621, 622, 587, 635, 400.22
See application file for complete search history.

(56) References Cited

U.S. PATENT DOCUMENTS 4,203,142 A   5/1980  Lee
5,578,912 A   11/1996 Mizuta et al.
(Continued)

FOREIGN PATENT DOCUMENTS

DE        4400234 C1      8/1995
DE    102011012314 A1     8/2012
(Continued)

*Primary Examiner* — Bentsu Ro
*Assistant Examiner* — Iftekhar Mustafa
(74) *Attorney, Agent, or Firm* — The Webb Law Firm (57) ABSTRACT

The invention relates to a device and to a method for monitoring an electrical network in a rail vehicle. The electrical network includes at least one converter, at least one drive motor, at least one first phase line for electrical connection of the at least one converter and the at least one drive motor. A magnitude of a current change of a first phase current is determined. A network error in a partial network on the machine side is detected if at least one criterion based on the current change is met. The criterion based on a current change is met when the magnitude of the current change of the first phase current is greater than a predetermined current change threshold.

17 Claims, 3 Drawing Sheets

(51) Int. Cl.
*H02H 3/027* (2006.01)
*H02H 7/085* (2006.01)
*H02H 7/122* (2006.01)
*H02H 7/26* (2006.01)

(52) U.S. Cl.
CPC ........ *H02H 7/0857* (2013.01); *H02H 7/0858* (2013.01); *H02H 7/122* (2013.01); *H02H 7/1227* (2013.01); *H02H 7/26* (2013.01)

(56) References Cited

U.S. PATENT DOCUMENTS

| | | | |
|---|---|---|---|
| 6,160,414 | A | 12/2000 | Matsubara et al. |
| 2014/0159740 | A1 | 6/2014 | Schuster et al. |
| 2017/0036631 | A1* | 2/2017 | List .................... B60R 21/0173 |
| 2017/0353138 | A1* | 12/2017 | Zhang .................. H02M 1/126 |
| 2017/0373927 | A1* | 12/2017 | Nandy .................... H04L 12/18 |

FOREIGN PATENT DOCUMENTS

| | | | |
|---|---|---|---|
| EP | 1847839 | A2 | 10/2007 |
| EP | 2144345 | A1 | 1/2010 |
| EP | 2784891 | A1 | 10/2014 |
| JP | 2006311684 | A | 11/2006 |
| WO | 2013010591 | A1 | 1/2013 |
| WO | 2013077152 | A1 | 5/2013 |

\* cited by examiner

METHOD AND DEVICE FOR MONITORING AN ELECTRICAL NETWORK IN A RAIL VEHICLE, AND RAIL VEHICLE

CROSS-REFERENCE TO RELATED APPLICATIONS

This application is the United States national phase of International Application No. PCT/EP2015/071817 filed Sep. 23, 2015, and claims priority to German Patent Application No. 10 2014 219 278.1 filed Sep. 24, 2014, the disclosures of which are hereby incorporated in their entirety by reference.

BACKGROUND OF THE INVENTION

Field of the Invention

The invention relates to a method and a device for monitoring an electrical network in a rail vehicle as well as to a rail vehicle.

Description of Related Art

In rail vehicles, both asynchronous and synchronous machines, including so-called permanent magnet machines (PMM), which are also referred to as permanent magnet motors, are used to drive the rail vehicle. The machines used to drive the rail vehicle are also referred to hereinafter as drive motors. These machines are supplied with electrical energy by a generally three-phase electrical network. The electrical network also comprises a power converter that, in a motor mode of the permanent magnet machine, converts a DC voltage, for example an intermediate circuit voltage, to a desired AC voltage for supplying the drive motor. However, the power converter can also, in a generator mode of the drive motor, convert the AC voltage generated by the drive motor to a DC voltage.

Short circuits may occur in the electrical network. They can occur both inside the drive motor, for example, inside a housing of the machine, or along a phase line for connecting the power converter and the drive motor. Short circuits may also occur in the power converter. In the event of short circuits, so-called electric arcs may also occur that may lead to the undesirable destruction of components of the rail vehicle.

It is known to monitor the level of a phase current, a short circuit being detected when the level of the phase current exceeds a predetermined threshold.

If such a short circuit is detected, the power converter is usually electrically disconnected from the drive motor, for example, by correspondingly arranged circuit breakers. At the same time, in particular given a permanent magnet machine as a drive motor, the rail vehicle is braked until it comes to a stop to prevent potential feeding of the short circuit.

The technical problem exists of creating a device and a method for monitoring an electrical network of a rail vehicle as well as a rail vehicle, the device and method enabling the alternative yet reliable and rapid detection of a network error. Furthermore, the technical problem exists of enabling the localization of a network error to provide improved error management.

SUMMARY OF THE INVENTION

A method is provided for monitoring an electrical network in a rail vehicle. The electrical network can in particular be a traction network of the rail vehicle or refer to a part of the traction network of the rail vehicle. The electrical network serves in particular to transfer energy between a power converter of the rail vehicle and a drive motor of the rail vehicle.

The electrical network comprises at least one power converter. The power converter can be operated both as an inverter and as a rectifier. For example, the power converter can be designed as a three-phase power converter. The power converter can in particular comprise electrical switching elements, such as MOSFET or IGBT.

On the input side, the power converter can be electrically connected to an intermediate circuit, in particular an intermediate circuit capacitor, of the rail vehicle. An intermediate circuit voltage falling across the intermediate circuit capacitor that is thus applied to the power converter on the input side is a DC voltage. On the output side, the power converter can be connected to the drive motor, for example, via at least one phase line.

Furthermore, the electrical network comprises at least one drive motor. The drive motor can, as explained above, refer to an electrical machine for driving the rail vehicle, in particular to a permanent magnet machine. The drive motor can thus be a synchronous machine having a permanently magnetized rotor. The drive motor can be operated in a motor mode. Electrical energy that is transmitted from the power converter to the drive motor is converted to mechanical energy. The electrical energy is transmitted in the form of an alternating current and an AC voltage that feed the drive motor. In a generator operating mode, mechanical energy is converted to electrical energy by the drive motor, it being possible to transmit the electrical energy to the power converter. The drive motor generates an alternating current and an AC voltage.

Furthermore, the electrical network comprises at least one first phase line for electrically connecting the at least one power converter and the at least one drive motor. The phase line refers to an electric line through which a first phase current can flow. The electrical network preferably comprises more than one, in particular three, phase lines. At least one electrical switching element, for example, a power switching element, in particular a MOSFET, an IGBT or a circuit breaker, can be arranged along the first phase line. An electrical connection of the power converter and the drive motor via the first phase line can be interrupted or established via the electrical switching element of the first phase line.

The power converter is preferably a three-phase power converter that is connected to a three-phase drive motor via three phase lines.

Furthermore, a level of a current change of the first phase current, in particular during a predetermined period of time, is determined. The level can be determined as the magnitude of the current change or refer to the magnitude. Thus, it is not the level of the current or the current value that is determined, but a temporal change of the first phase current or a level of this change. The level of the current change can be determined, for example, by forming the first derivative.

Within the meaning of this invention, the term "determine" refers to the direct detection of a variable, for example, by a detection means or a sensor, or the calculation of the variable from at least one directly detected variable. Thus, for example, a current value of the first phase current can be detected, for example, by a current sensor, the current change being determined within a predetermined period of time as a function of the current value.

The network can therefore comprise at least one first detection means for directly detecting the current change of the first phase current. However, it is also possible that the electrical network comprises a first detection means for detecting an electrical variable, for example the current value, of the first phase current and at least a first determination means, the first determination means determining the level of current change of the first phase current as a function of the detected electrical variable. The determination means can be designed as an FPGA.

If more than one phase line, in particular three phase lines, is present, the electrical network can, of course, comprise further detection means and, if applicable, determination means that enable the determination of the current change level of the further phase currents. Thus, the level of current change of at least one further phase current is determined given a multiphase connection.

For example, a level of current change of the first phase current and a level of current change of a further phase current, for example, a second phase current or a third phase current, can be determined in a three-phase electrical network. The level of current change of the remaining phase current can then be determined as a function of the levels of current change already determined. For this purpose, the electrical network can, for example, comprise a first current sensor for detecting the current value of the first phase current and a further current sensor for detecting a current value of a further phase current. The level of the current changes can then be determined by one or more determination means.

The embodiments specified in the following of the method according to the invention for the first phase line apply accordingly to further phase lines of the electrical network.

Furthermore, a network error in a machine-side sub-network is detected if at least one criterion based on a current change is met. The criterion based on a current change is met if the level of the current change of the first phase current is higher than a predetermined current change threshold.

The machine-side sub-network refers to at least the part of the electrical network that is arranged between a determination point of the electrical network, in or at which the level of current change of the first phase current is determined, and the drive motor and comprises at least one part of the drive motor. Thus, the machine-side sub-network can at least comprise the section of the first phase line that connects the determination point described above to the drive motor and comprises at least one part of the electrical network of the drive motor.

The determination point refers to a point or section of the first phase line in which the current change to be determined according to the invention occurs. The determination point can thus refer to the point or section in which the current sensor described above is arranged.

In addition to the machine-side sub-network, the electrical network can also comprise a sub-network on the power converter side, the sub-network on the power converter side comprising the part of the electrical network that is arranged between the determination point and the power converter as well as the power converter itself.

A network error refers in particular to a short circuit or the occurrence of an undesirable, low-inductance connection.

The current change thresholds can be determined as a function of the electrical properties of the electrical network, in particular inductances of the electrical network.

The power converter of the electrical network or the part of the electrical network on the power converter side usually has low inductance. If a network error occurs in the machine-side part of the electrical network, in particular a short circuit or an undesirably low-inductance connection, a very high current will flow from the part on the power converter side to the machine-side part of the electrical network for a short period of time due to the low inductance of the power converter or the part on the power converter side. The drive motor and the phase line(s) usually have higher inductance than the power converter or the part of the electrical network on the power converter side. If a network error, in particular a short circuit or an undesirably low-impedance connection, occurs in the part on the power converter side, a lower current will flow from the machine-side sub-network to the sub-network on the power converter side for a longer period of time compared to the case of a network error in the machine-side part. Thus, it follows that a high current change occurs in the event of a network error in the machine-side part, while a comparably lower current change occurs in the event of a network error in the part on the power converter side. However, it is to be assumed that at least the current change in the event of a network error in the machine-side sub-network is higher than a maximum permissible or maximum expected current change in the error-free state of the electrical network.

A person skilled in the art can determine the current change threshold(s) as a function of the electrical properties of the electrical network, for example, using suitable simulations and/or experiments and/or calculations.

Advantageously, the result as a whole is that a network error can be detected reliably and rapidly by evaluating the level of current change, it being possible to additionally associate this network error with the machine-side sub-network. Thus, the localization of the network error is advantageously made possible at the same time in addition to the mere detection of a network error.

As explained in even more detail hereinafter, protective functions depending on an error location can thus be initiated.

In a further embodiment, the current change of the first phase current is cyclically determined. A cycle can have a predetermined duration, for example a duration within a range of 1 μs (including) to 5 μs (including). The duration of a cycle is preferably 2 μs.

The criterion based on a current change is met if the level of current change is higher than the predetermined current change threshold for at least a predetermined number of cycles, in particular of cycles in immediate chronological succession. As a result, the reliability of the detection is advantageously increased.

In a further embodiment, an error location in the machine-side sub-network is determined as a function of the level of current change.

For example, it can be assumed that a correlation between the level of current change and a distance of the error location in the machine-side sub-network from the determination point described above is such that the level of current change decreases as the distance increases. For example, the level of current change can decrease linearly or exponentially as the distance increases.

This distance can refer to a length of an, in particular shortest, electrical connection, for example, of the phase line, that connects the determination point described above to the error location.

The current change threshold described above can be selected in such a way that a network error can be detected regardless of the error location in the machine-side sub-network. This means that the predetermined current change threshold is selected in such a way that a network error can be detected even at a maximum distance between the error location in the machine-side sub-network and the determination point.

In addition, the distance of the error location can be determined depending on the determined level of current change as a function of the previously known correlation between the level of current change and the distance described above.

It is, for example, possible to divide the machine-side sub-network into several sections. Each section can be associated with a section-specific minimum level of current change and a section-specific maximum level of current change and thus a section-specific interval of the level of current change. The smaller the distance of the section from the determination point, the higher the section-specific minimum level of current change and the section-specific maximum level of current change to be selected.

As a function of the level of current change determined according to the invention, the corresponding interval, in which the determined level of current change lies, can be determined. The section that is associated with this interval can then be determined as an error location.

This advantageously results in a more precise spatial localization of the error location. This in turn advantageously enables the improved error location-dependent execution of protective functions.

In a further embodiment, a level of the first phase current is determined. The level can be determined as a magnitude or refer to the magnitude. The level can, for example, be an amplitude or an RMS value of the first phase current. Furthermore, a network error is detected in the machine-side sub-network if a criterion based on a current value is additionally met, the criterion based on a current value being met if the level of the first phase current is higher than a predetermined current value threshold.

Thus, at least two criteria must be met in order to detect a network error in the machine-side sub-network. As a result, the reliability of the detection is further increased.

In a further embodiment, an error location in the machine-side sub-network is determined when a network error is detected in the machine-side sub-network and an error location-dependent protective function is executed, wherein a current flow in an erroneous network section is reduced. The erroneous network section can include the error location. For example, a current flow in the erroneous network section can be interrupted. For this purpose, the erroneous network section can be isolated on one side or two sides. The reduction or interruption of the current flow in the erroneous network section can, for example, be done by opening at least one electrical switching element, which connects the erroneous network section to a further network section. This is particularly advantageous if the drive motor is designed as a permanent magnet machine.

For this purpose, the electrical network, in particular the first phase line, can comprise one or more electrical switching elements that can interrupt or establish an electrical connection for various sections of the phase line.

The speed of the drive motor can alternatively or cumulatively be reduced. For this purpose, a rotor of the permanent magnet machine can, for example, be braked. However, the rail vehicle can preferably be braked via at least one braking device. Of course, the speed of the drive motor can be reduced to zero.

Of course, it is also possible to reduce, in particular interrupt, the current flow through the phase line without determining the error location in the machine-side sub-network, and/or it is possible to reduce the speed of the drive motor.

This advantageously results in a method for managing errors in the electrical network.

In an alternative embodiment, the speed of the drive motor is reduced when a network error is detected in the machine-side sub-network. Reference can be made here to the preceding explanations. Thus, in this alternative embodiment, no error location is determined in the machine-side sub-network. An error location-independent protective function is thus implemented.

In this case, the electrical connection between the power converter and the drive motor, i.e. at least the first phase line, will alternatively or cumulatively be interrupted. This advantageously results in high operational safety if an error location in the machine-side sub-network cannot be determined with sufficient accuracy or is not determined. In this case, the drive motor is partially or preferably fully braked to prevent the network error, in particular the short circuit, from being fed.

In a further embodiment, the electrical network comprises three phase lines for electrically connecting the at least one power converter and the at least one drive motor, a level of current change being determined for all phase currents. For this purpose, all phase currents can be detected, for example, via a current sensor. It is also only possible to detect two of the three phase currents and calculate the remaining phase current as a function of the detected phase currents.

Furthermore, a phase-specific network error in the machine-side sub-network is detected if the at least one criterion based on a current change is met for any of the phase lines. This advantageously results in the ability to reliably monitor a three-phase network.

If a network error is detected in only one of the phase lines, this phase line or all phase lines can be interrupted. If network errors are detected in only two of the phase lines, these two phase lines or all phase lines can be interrupted. If network errors are detected in three phase lines, all phase lines can be interrupted.

Furthermore, a device is provided for monitoring an electrical network in a rail vehicle. The device is designed in such a way that a method according to any of the embodiments described above can be performed using the device. In particular, the device comprises at least one evaluation device.

The electrical network, which is monitored via the device, is designed as explained above. Furthermore, the device comprises at least one evaluation device and at least one first means for determining a level of current change of a first phase current. The first means for determining the current change can be designed, as explained above, as a means for detecting the current change. Alternatively, the first means can also comprise a means for detecting an electrical variable and a determination means, it being possible for the determination means to determine the current change as a function of the detected electrical variable. The evaluation device and the at least one means for determination can also be designed as a combined means. The means for detecting an electrical variable and the determination means can also be designed as a combined means.

Furthermore, the level of current change of the first phase current can be determined.

Furthermore, a network error in a machine-side sub-network can be detected by the evaluation device if at least one criterion based on a current change is met, the criterion based on a current change being met if the level of current change of the first phase current is higher than a predetermined current change threshold.

The device advantageously allows any of the methods described above to be carried out.

Also provided is a rail vehicle, the rail vehicle comprising the device described above. This advantageously results in a rail vehicle having high operational safety.

BRIEF DESCRIPTION OF THE DRAWINGS

The invention is described in greater detail based on several exemplary embodiments. The figures show.

DETAILED DESCRIPTION OF THE INVENTION

Below, identical reference numbers refer to elements having the same or similar technical features.

Figure 1:
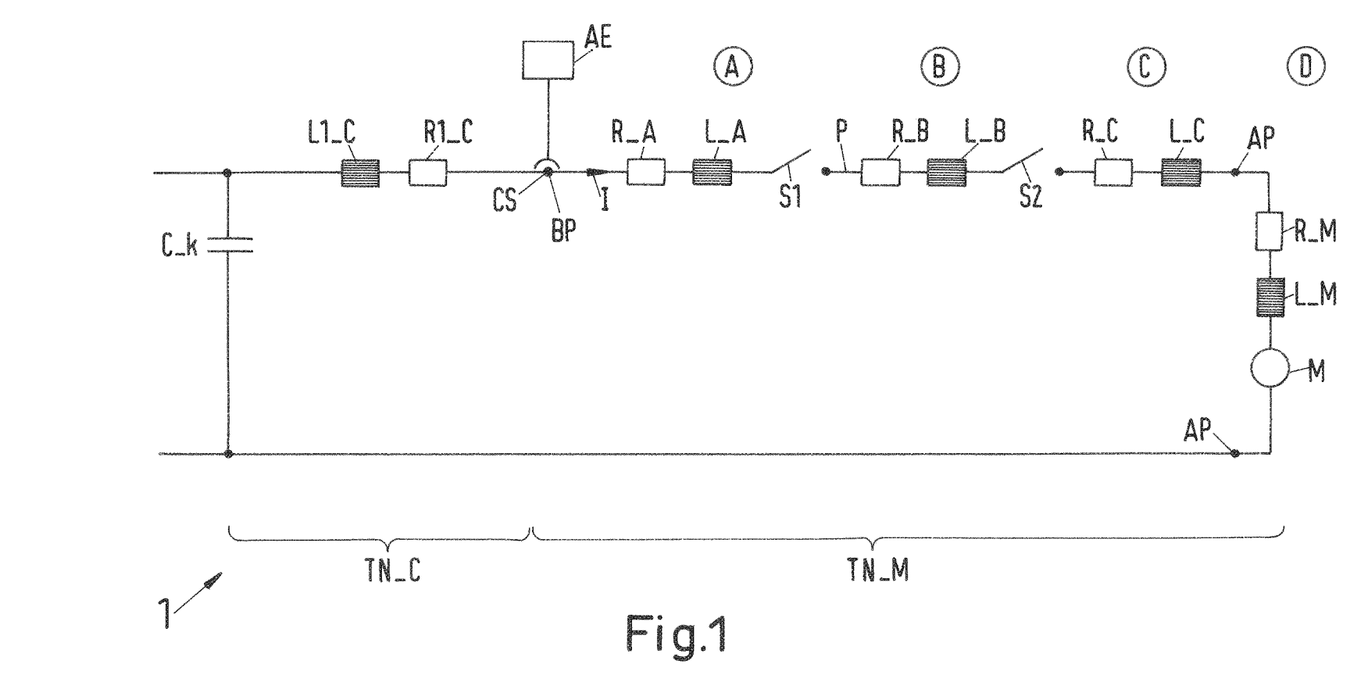
FIG. 1 shows an exemplary equivalent circuit diagram of an electrical network in a rail vehicle.

In FIG. 1, an equivalent circuit diagram of the electrical network 1 of a rail vehicle (not shown) is illustrated. This is a 2-phase system, the electrical components of a feed and return line in the upper phase line being summarized. The electrical network 1 comprises a power converter C (see FIG. 2), a resulting inductance L1_C and a resulting resistance R1_C of the power converter C being shown in FIG. 1. Also shown is an intermediate circuit capacitor C_k. Furthermore, the electrical network 1 comprises a permanent magnet machine M, a resulting inductance L_M and a resulting resistance R_M of the permanent magnet machine M also being shown. Also shown is a phase line P having a first section A, a second section B and a third section C.

Also shown are a current sensor CS and an evaluation device AE. The current sensor CS detects a current value in a determination point BP of the phase line P. A current I is shown here by way of example.

The evaluation device AE determines a current change dI/dt as a function of the current value and a duration dt. This current change is cyclically determined.

Also shown are resulting resistances R_A, R_B, R_C of the individual sections A, B, C of the phase line P. Accordingly, resulting inductances L_A, L_B, L_C of the sections A, B, C are also shown.

A first electrical switching element S1 is arranged along the phase line P, which, for example, can be referred to as a motor circuit breaker. A further electrical switching element S2 is also arranged along the phase line P, which, for example, can be referred to as an emergency motor circuit breaker. An electrical connection between the power converter C and the permanent magnet machine M via the phase line P can be established or interrupted by the switching elements S1, S2.

The first section A comprises at least one section of the phase line P between the determination point BP and the first electrical switching element S1.

The second section B comprises a section of the phase line P between the first electrical switching element S1 and the second electrical switching element S2.

The switching elements S1, S2 are arranged in such a way that the first section A can be connected to the second section B via the first switching element S1. Furthermore, the second section B can be connected to the third section C via the second switching element S2. Motor protection switches, which allow the electrical connection at terminal points AP of the permanent magnet machine M to be interrupted, are not shown.

The third section C comprises a section of the phase line P between the second electrical switching element S2 and a terminal point AP of the permanent magnet machine M. Also shown is a fourth section D that comprises the electrical network of the permanent magnet machine M up to the terminal points AP.

A level or magnitude of current change of the phase current I can be determined in each cycle via the evaluation device AE. The evaluation device AE is also used to evaluate whether a criterion based on a current change is met, this criterion being met if the level of current change of the phase current I in each cycle is higher than a first predetermined magnitude or the magnitude of the current change threshold SW1 (see FIG. 3).

If the criterion based on a current change is met, a network error, in particular a short circuit, is thus detected in a machine-side sub-network TN_M. The machine-side sub-network TN_M comprises at least the part of the electrical network 1 that comprises the part of the phase line P which is arranged between the determination point BP and terminal point AP of the permanent magnet machine M. The machine-side sub-network TN_M also comprises at least one part of the electrical network of the permanent magnet machine M.

A sub-network on the power converter side TN_C is likewise shown. This comprises at least one part of the electrical network of the power converter C (not shown) as well as the part of the phase line P that connects the power converter C and the determination point BP.

The network error detected as described above is detected in the machine-side sub-network TN_M.

It is also possible that a level or magnitude of the phase current I is determined by the evaluation device AE. In this case, a network error in can be detected in the machine-side sub-network TN_M if a criterion based on a current value is additionally met. This criterion is met if the level of the phase current I is higher than a predetermined current value threshold.

If a network error is detected in the machine-side sub-network TN_M, at least one of the switching elements S1, S2, preferably both switching elements S1, S2, can be opened.

Figure 2:
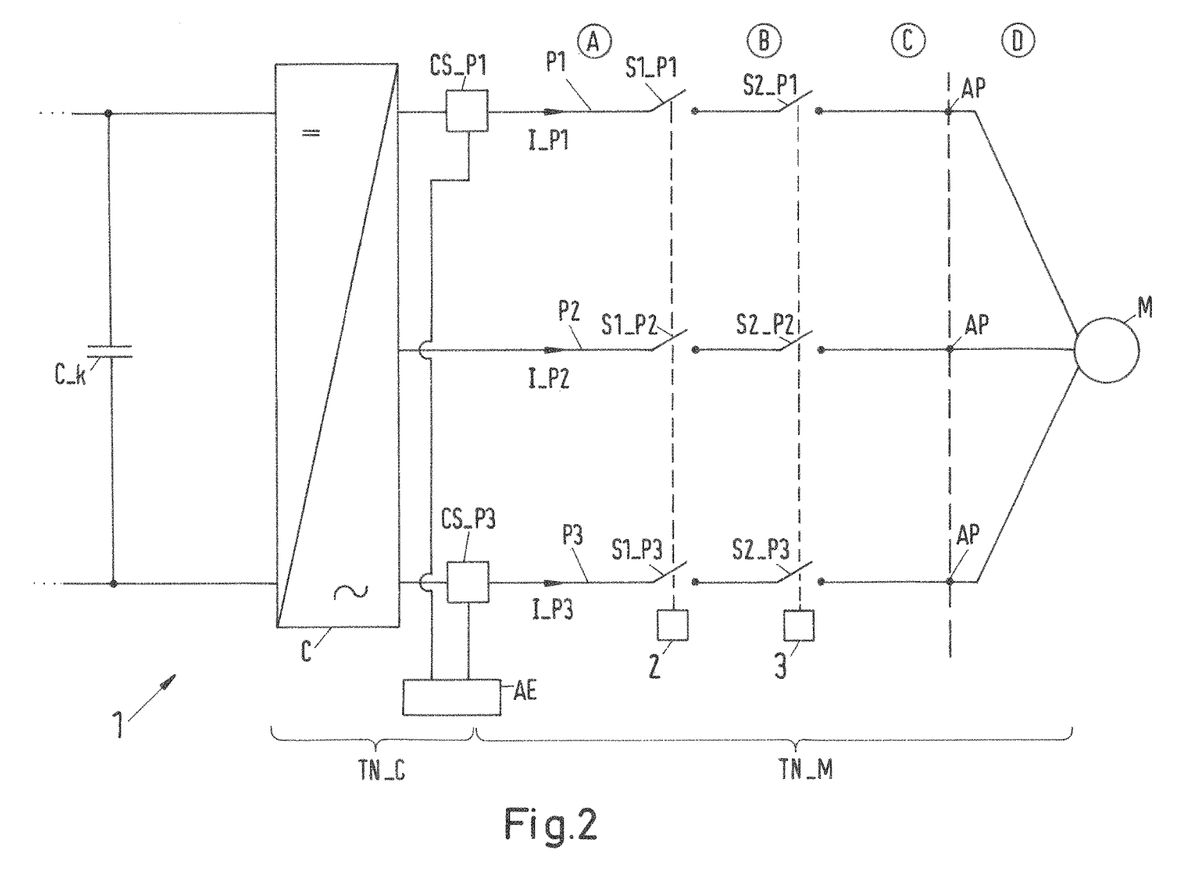
FIG. 2 shows a schematic circuit diagram of an electrical network of the rail vehicle and various types of error detection and FIG. 3 shows an exemplary functional correlation between a level of current change and a distance of an error location from a determination point.

In FIG. 2, a three-phase electrical network 1 of a rail vehicle (not shown) is illustrated schematically. An intermediate circuit capacitor C_k is again shown here that is electrically connected to a power converter C on the input side. On the output side, the power converter C is connected to a permanent magnet machine M via three phases P1, P2, P3. No resulting resistances or resulting inductances are shown in FIG. 2.

A first current sensor CS_P1 for detecting a first phase current I_P1 in a first phase line P1 is also shown. A further current sensor CS_P3 for detecting a third phase current I_P3 in a third phase line P3 is also shown. A second phase current I_P2 in a second phase line P2 can be determined as a function of the remaining phase currents I_P1, I_P3.

Corresponding to the phase line P shown in FIG. 1, each of the phase lines P1, P2, P3 comprises a first electrical switching element S1_P1, S1_P2, S1_P3 and a second electrical switching element S2_P1, S2_P2, S2_P3. A subdivision of the respective phase line P1, P2, P3 into sections A, B, C is likewise shown. Terminal points AP of the permanent magnet machine M are likewise shown, a fourth section D comprising an electrical network of the permanent magnet machine M. Here, it is shown that the first electrical switching elements S1_P1, S1_P2, S1_P3 are controlled by a control device 2, i.e. can be opened or closed. The first electrical switching elements S1_P1, S1_P2, S1_P3 can be controlled jointly, in particular simultaneously, by the control device 2.

It is also shown that the second electrical switching elements S2_P1, S2_P2, S2_P3 are controlled by a second control device 3, i.e. can be opened or closed. The second electrical switching elements S2_P1, S2_P2, S2_P3 can likewise be controlled jointly, in particular simultaneously, by the second control device 3.

A level or magnitude of a current change of the first phase current I_P1, the second phase current I_P2 and the third phase current I_P3 can be determined cyclically by an evaluation device AE. A network error in a machine-side sub-network can be detected if the criterion based on a current change described above is met for at least one of the phase currents I_P1, I_P2, I_P3.

If a network error is detected in the machine-side sub-network TN_M, at least two, but preferably all, of the first switching elements S1_P1, S1_P2, S1_P3 can be opened. At least two, but preferably all, of the second switching elements S1_P1, S1_P2, S1_P3 can be opened alternatively or cumulatively. In particular, the first and/or second switching element(s) S1_P1, S1_P2, S1_P3, S2_P1, S2_P2, S2_P3 of the phase line(s) for which the criterion based on a current change is met can be opened.

A device for monitoring the electrical network 1 can at least comprise the evaluation device AE. It can preferably also comprise the current sensors CS_P1, CS_P3.

Figure 3:
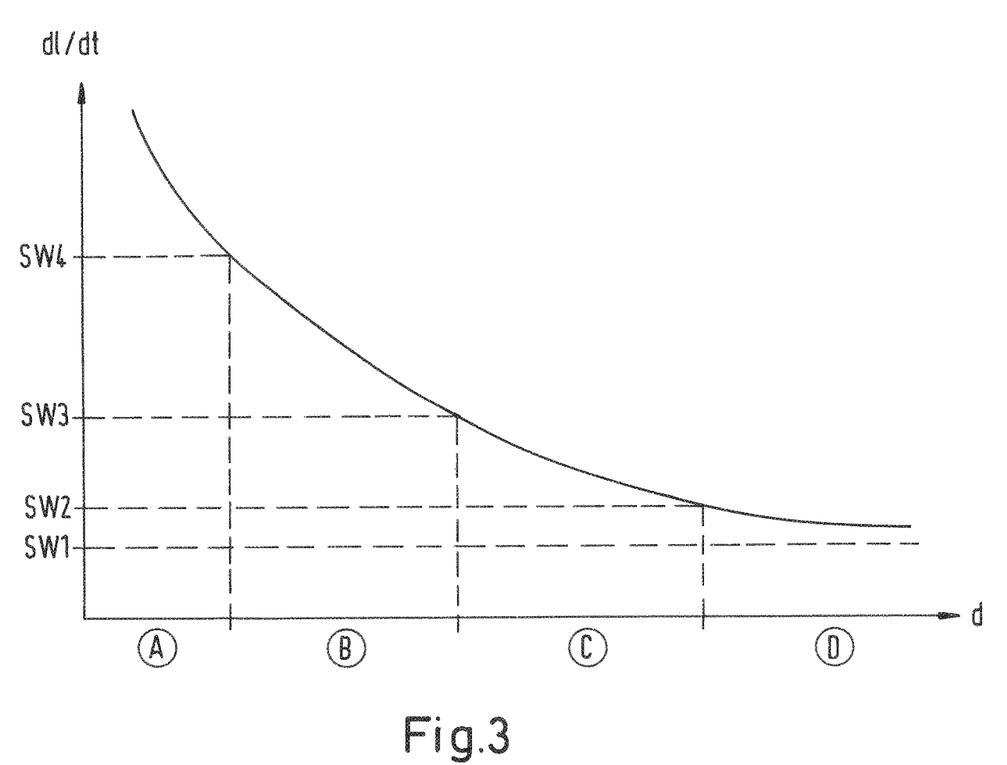

In FIG. 3, an exemplary correlation is shown between a level of current change dI/dt and a distance d of an error location from a determination point BP (see FIG. 1) in a phase line P1, P2, P3. Here, it is shown that the level of current change determined by the evaluation device AE becomes higher the closer the error location is to the determination point BP. In particular, the level of current change decreases exponentially as the distance d from the determination point BP increases.

If the level of current change is higher than a first predetermined current change threshold SW1, a network error in the machine-side sub-network TN_M (see FIG. 1 and FIG. 2) can be detected. Thus, it is also possible to detect the presence of a network error either in the first section A, in the second section B, in the third section C or in the fourth section D (see FIG. 1).

If such a network error is detected, the speed of the permanent magnet machine M can be reduced, in particular by partially or fully braking the rail vehicle, i.e. to a standstill.

An error location in the fourth section D can be detected if the level of current change is higher than the first predetermined current change threshold SW1 and lower than or the same as a second predetermined current change threshold SW2.

If the level of current change determined by the evaluation device AE is higher than the second predetermined current change threshold SW2, it is possible to detect the presence of an error location either in the first section A or in the second section B or in the third section C of the machine-side sub-network TN_M. If the level of current change is lower than or the same as a third predetermined current change threshold SW3 but higher than the second predetermined current change threshold SW2, it is possible to detect the presence of the error location in the third section C.

Accordingly, it is possible to detect the presence of the error location in the second section B if the level of current change is higher than the third predetermined current change threshold SW3 but lower than or the same as a fourth predetermined current change threshold SW4. The presence of the error location in the first section A can be detected if the level of current change is higher than the fourth predetermined current change threshold SW4.

Depending on a section A, B, C, D of the error location determined in this manner, an error location-dependent protective function can be executed. If the error location is, for example, in the second section B, the first switching element S1 and the second switching element S2 (see FIG. 1) can be opened. If the location is in the third section C, the second switching element S2 can, for example, be opened, and the electrical connection at the terminal point AP of the permanent magnet machine M can be interrupted.

If the error location is, for example, in the fourth section D, the electrical connection at the terminal point AP can be interrupted, and the speed of the engine can be decreased. If the error location is in the first section A, the first switching element S1 can be opened.

The overall, advantageous result is thus a method and a device for monitoring the electrical network 1 of a rail vehicle enabling the reliable and rapid detection of a network error. At the same time, unnecessary train shutdowns, i.e. unnecessary decelerations of the rail vehicle, can be avoided. If an error location is determined outside of the sections C and D, a reduction of the speed of the permanent magnet machine M is not absolutely necessary. Thus, it is possible to drive the rail vehicle using further drive means, such as further permanent magnet machines.

The invention claimed is:

1. A method for monitoring an electrical network in a rail vehicle, the electrical network comprising at least one power converter, at least one drive motor and at least one first phase line for electrically connecting the at least one power converter and the at least one drive motor, wherein
   a level of current change of a first phase current is determined, a network error being detected if at least one criterion based on a current change is met, the criterion based on a current change being met if the level of current change of the first phase current is higher than a predetermined current change threshold, wherein
   the network error being detected in a machine-side sub-network, wherein an error location in the machine-side sub-network is determined as a function of the level of current change, wherein the level of current change decreases as the distance between the error location in the machine-side sub-network and a determination point in which the current change to be determined occurs increases.

2. The method according to claim 1, wherein the current change of the first phase current is cyclically determined, the criterion based on a current change being met if the level of current change is higher than the predetermined current change threshold for at least a predetermined number of cycles.

3. The method according to claim 2, wherein a level of the first phase current is determined, a network error being detected in the machine-side sub-network if a criterion based on a current value is additionally met, the criterion based on a current value being met if the level of the first phase current is higher than a predetermined current value threshold.

4. The method according to claim 2, wherein an error location in the machine-side sub-network is determined when a network error is detected in the machine-side sub-network and an error location-dependent protective function is executed, a current flow in an erroneous network section being reduced and/or a speed of the drive motor being reduced.

5. The method according to claim 2, wherein a speed of the drive motor is reduced and/or at least the first phase line is interrupted when a network error is detected in the machine-side sub-network.

6. The method according to claim 2, wherein the electrical network comprises three phase lines for electrically connecting the at least one power converter and the at least one drive motor, a level of current change of all phase currents being determined, a phase-specific network error being detected in the machine-side sub-network if the at least one criterion based on a current change is met for one of the phase lines.

7. The method according to claim 1, wherein a level of the first phase current is determined, a network error being detected in the machine-side sub-network if a criterion based on a current value is additionally met, the criterion based on a current value being met if the level of the first phase current is higher than a predetermined current value threshold.

8. The method according to claim 7, wherein an error location in the machine-side sub-network is determined when a network error is detected in the machine-side sub-network and an error location-dependent protective function is executed, a current flow in an erroneous network section being reduced and/or a speed of the drive motor being reduced.

9. The method according to claim 7, wherein a speed of the drive motor is reduced and/or at least the first phase line is interrupted when a network error is detected in the machine-side sub-network.

10. The method according to claim 7, wherein the electrical network comprises three phase lines for electrically connecting the at least one power converter and the at least one drive motor, a level of current change of all phase currents being determined, a phase-specific network error being detected in the machine-side sub-network if the at least one criterion based on a current change is met for one of the phase lines.

11. The method according to claim 1, wherein an error location in the machine-side sub-network is determined when a network error is detected in the machine-side sub-network and an error location-dependent protective function is executed, a current flow in an erroneous network section being reduced and/or a speed of the drive motor being reduced.

12. The method according to claim 11, wherein the electrical network comprises three phase lines for electrically connecting the at least one power converter and the at least one drive motor, a level of current change of all phase currents being determined, a phase-specific network error being detected in the machine-side sub-network if the at least one criterion based on a current change is met for one of the phase lines.

13. The method according to claim 1, wherein a speed of the drive motor is reduced and/or at least the first phase line is interrupted when a network error is detected in the machine-side sub-network.

14. The method according to claim 13, wherein the electrical network comprises three phase lines for electrically connecting the at least one power converter and the at least one drive motor, a level of current change of all phase currents being determined, a phase-specific network error being detected in the machine-side sub-network if the at least one criterion based on a current change is met for one of the phase lines.

15. The method according to claim 1, wherein the electrical network comprises three phase lines for electrically connecting the at least one power converter and the at least one drive motor, a level of current change of all phase currents being determined, a phase-specific network error being detected in the machine-side sub-network if the at least one criterion based on a current change is met for one of the phase lines.

16. A device for monitoring an electrical network in a rail vehicle, the electrical network comprising at least one power converter, at least one drive motor and at least one first phase line for electrically connecting the at least one power converter and the at least one drive motor, the device comprising at least one evaluation device and at least one first means for determining a level of current change of a first phase current, wherein
  a level of current change of the first phase current is determinable,
  a network error being detectable by the evaluation device if at least one criterion based on a current change is met, the criterion based on a current change being met if the level of current change of the first phase current is higher than a predetermined current change threshold, wherein
  the network error being detectable in a machine-side sub-network, an error location in the machine-side sub-network being determinable as a function of the level of current change, wherein the level of current change decreases as the distance between the error location in the machine-side sub-network and a determination point in which the current change to be determined occurs increases.

17. A rail vehicle comprising a device according to claim 16.

* * * * *